US011922250B2

(12) United States Patent
Kan et al.

(10) Patent No.: US 11,922,250 B2
(45) Date of Patent: *Mar. 5, 2024

(54) COLLABORATIVE RFID READER USING CODE DIVISIONAL MULTIPLE ACCESS (CDMA) AND METHODS FOR SAME

(71) Applicant: Cornell University, Ithaca, NY (US)

(72) Inventors: Edwin C. Kan, Ithaca, NY (US); Xiaonan Hui, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,325

(22) Filed: Jun. 13, 2022

(65) Prior Publication Data

US 2022/0318525 A1 Oct. 6, 2022

Related U.S. Application Data

(63) Continuation of application No. 17/055,974, filed as application No. PCT/US2019/032255 on May 14, 2019, now Pat. No. 11,392,782.

(60) Provisional application No. 62/671,405, filed on May 14, 2018.

(51) Int. Cl.
*G06K 7/10* (2006.01)
*G06K 19/07* (2006.01)
*H04B 5/00* (2006.01)
*H04B 7/216* (2006.01)

(52) U.S. Cl.
CPC ..... *G06K 7/10019* (2013.01); *G06K 19/0724* (2013.01); *H04B 5/0031* (2013.01); *H04B 5/0037* (2013.01); *H04B 7/216* (2013.01)

(58) Field of Classification Search
CPC .............. G06K 7/10019; G06K 19/0724
See application file for complete search history.

(56) References Cited

U.S. PATENT DOCUMENTS

| 5,640,683 A | 6/1997 | Evans et al. |
| 5,777,561 A | 7/1998 | Chieu et al. |
| 5,873,025 A | 2/1999 | Evans et al. |

(Continued)

FOREIGN PATENT DOCUMENTS

| EP | 853392 A2 | 7/1998 |
| EP | 670558 B1 | 5/2000 |

(Continued)

OTHER PUBLICATIONS

First Office Action from Intellectual Property of India for Application No. 202017052520, dated Sep. 27, 2022, 7 pages.

(Continued)

*Primary Examiner* — Daniell L Negron
(74) *Attorney, Agent, or Firm* — Barnes & Thornburg LLP

(57) ABSTRACT

The present disclosure provides collaborative radiofrequency identification (RFID) readers that employ code division multiple access (CDMA) encoding to simultaneously broadcast to and read responses from tags in an overlapping reading zone with improved data synchronization and read yield rates. In some embodiments, a harmonic backscattering scheme is used to enable the system to have a much higher signal-to-noise ratio (SNR) and sensitivity, while the reader CDMA protocol can be integrated with an initial TDMA polling process or alternative tag CDMA scheme.

16 Claims, 12 Drawing Sheets

(56) References Cited

U.S. PATENT DOCUMENTS

| | | | |
|---|---|---|---|
| 5,935,077 A | 8/1999 | Ogle | |
| 5,952,922 A | 9/1999 | Shober | |
| 6,650,230 B1 | 11/2003 | Evans et al. | |
| 7,096,133 B1 | 8/2006 | Martin et al. | |
| 7,603,894 B2 | 10/2009 | Breed | |
| 7,693,626 B2 | 4/2010 | Breed et al. | |
| 7,938,013 B2 | 5/2011 | Hughes et al. | |
| 8,024,084 B2 | 9/2011 | Breed | |
| 8,267,325 B2 | 9/2012 | Phaneuf | |
| 8,721,559 B2 | 5/2014 | Peterson et al. | |
| 8,754,749 B2 * | 6/2014 | Maltseff | G06K 7/0008 340/10.1 |
| 8,989,867 B2 | 3/2015 | Chow et al. | |
| 9,330,561 B2 | 5/2016 | Proud | |
| 9,443,358 B2 | 9/2016 | Breed | |
| 9,489,813 B1 | 11/2016 | Beigel | |
| 9,645,234 B2 | 5/2017 | Khan et al. | |
| 9,744,369 B2 | 8/2017 | Poon et al. | |
| 9,949,691 B2 | 4/2018 | Huppert et al. | |
| 10,863,313 B2 | 12/2020 | Markhovsky et al. | |
| 2003/0139691 A1 | 7/2003 | Kumar et al. | |
| 2004/0032363 A1 | 2/2004 | Schantz et al. | |
| 2005/0190098 A1 | 9/2005 | Bridgelall et al. | |
| 2005/0206555 A1 | 9/2005 | Bridgelall et al. | |
| 2006/0012476 A1 | 1/2006 | Markhovsky et al. | |
| 2006/0022800 A1 | 2/2006 | Krishna et al. | |
| 2006/0224048 A1 | 10/2006 | Devaul et al. | |
| 2006/0284727 A1 | 12/2006 | Steinke | |
| 2007/0096883 A1 * | 5/2007 | Kim | G06K 13/00 235/375 |
| 2007/0222560 A1 | 9/2007 | Posamentier | |
| 2007/0279194 A1 | 12/2007 | Carrender et al. | |
| 2008/0030244 A1 | 2/2008 | Leifso | |
| 2008/0299933 A1 | 12/2008 | Chang et al. | |
| 2009/0167699 A1 | 7/2009 | Rosenblatt et al. | |
| 2010/0039228 A1 | 2/2010 | Sadr et al. | |
| 2010/0060424 A1 | 3/2010 | Wild et al. | |
| 2010/0201492 A1 | 8/2010 | Koo et al. | |
| 2010/0214065 A1 | 8/2010 | Maltseff et al. | |
| 2010/0292568 A1 | 11/2010 | Droitcour et al. | |
| 2011/0028854 A1 | 2/2011 | Addison et al. | |
| 2011/0148710 A1 | 6/2011 | Smid et al. | |
| 2011/0187600 A1 | 8/2011 | Landt | |
| 2012/0235689 A1 | 9/2012 | Jau et al. | |
| 2012/0235856 A1 | 9/2012 | Nogami et al. | |
| 2012/0249302 A1 | 10/2012 | Szu | |
| 2012/0256730 A1 | 10/2012 | Scott et al. | |
| 2013/0030257 A1 | 1/2013 | Nakata et al. | |
| 2013/0030259 A1 | 1/2013 | Thomsen et al. | |
| 2013/0043981 A1 | 2/2013 | Wang et al. | |
| 2013/0165770 A1 | 6/2013 | Li et al. | |
| 2013/0289379 A1 | 10/2013 | Song et al. | |
| 2014/0292491 A1 | 10/2014 | Maltseff et al. | |
| 2014/0330540 A1 | 11/2014 | Lin et al. | |
| 2015/0108210 A1 | 4/2015 | Zhou | |
| 2015/0198708 A1 | 7/2015 | Khan et al. | |
| 2015/0282711 A1 | 10/2015 | Thomas et al. | |
| 2016/0143557 A1 | 5/2016 | Kahlman et al. | |
| 2016/0166160 A1 | 6/2016 | Casale | |
| 2016/0338798 A1 | 11/2016 | Vora et al. | |
| 2017/0055872 A1 | 3/2017 | Tupin, Jr. | |
| 2017/0065184 A1 | 3/2017 | Barak | |
| 2017/0082741 A1 | 3/2017 | Adib et al. | |
| 2017/0108452 A1 | 4/2017 | Carlson | |
| 2017/0367619 A1 | 12/2017 | Zhan | |
| 2018/0032768 A1 | 2/2018 | Ganesan et al. | |
| 2019/0261137 A1 | 8/2019 | Markhovsky et al. | |

FOREIGN PATENT DOCUMENTS

| | | |
|---|---|---|
| EP | 1744267 A2 | 1/2007 |
| WO | 2016065368 A1 | 4/2016 |
| WO | 2017093391 A1 | 6/2017 |
| WO | 2017153907 A1 | 9/2017 |
| WO | 2018011697 A1 | 1/2018 |

OTHER PUBLICATIONS

Hui, X. and Kan, E.C., Monitoring vital signs over multiplexed radio by near-field coherent sensing, Nature Electronics, Nov. 27, 2017, vol. 1, pp. 74-78. Nov. 27, 2017.

Saccone, L., Near-Field Coherent Sensing Used to Monitor Vital Signs, Engineering News, Nov. 30, 2017, 4 pages. Nov. 30, 2017.

* cited by examiner

COLLABORATIVE RFID READER USING CODE DIVISIONAL MULTIPLE ACCESS (CDMA) AND METHODS FOR SAME

CROSS-REFERENCE TO RELATED APPLICATIONS

This application is a continuation of U.S. application Ser. No. 17/055,974, filed on Nov. 16, 2020, which is a National Stage Application claiming priority to PCT/US2019/32255, which claims priority to U.S. Provisional Application No. 62/671,405, filed on May 14, 2018, the disclosures of which are all incorporated herein by reference.

STATEMENT REGARDING FEDERALLY SPONSORED RESEARCH

This invention was made with government support under DE-AR0000528 awarded by the Department of Energy. The government has certain rights in the invention.

FIELD OF THE DISCLOSURE

The present disclosure relates to RFID systems, and in particular, simultaneous RFID signaling by multiple collaborative readers using CDMA reader encoding.

BACKGROUND OF THE DISCLOSURE

Read reliability is one of the critical limits of ultra-high-frequency ("UHF") radio frequency identification ("RFID") systems when a large number of passive tags are present in a complex multi-path environment. In many practical applications, read failure rates often should be lower than 10-5, or equivalently, read yields should be above 99.999%, to achieve manageable logistic purposes in Internet of Things ("IoT"). Because of the directivities of reader and tag antennas and RF shadowing from objects and other tags, a tag at a certain position and/or orientation may not be able to harvest sufficient RF energy from a reader to power up, or the tag may not effectively backscatter to the reader even if it is within the nominal reading range.

Previous RFID systems with the electronic production code ("EPC") generation 2 (Gen 2) protocol perform a detailed tag singulation process in time division multiple access ("TDMA"), explore multiple reader antenna placement, and introduce relative movement between the reader and tags to minimize the read failure probability, but with only limited success. Alternatively, to improve the read yield or to enlarge the total coverage area, one can disperse more readers with significantly overlapped reading zones. However, this has the potential for severe reader-to-reader collision ("R2RC") that is difficult to resolve within the current EPC tag TDMA scheme. This is because when multiple readers are employed, further collaborative reader TDMA schemes need to be adopted by all readers to resolve R2RC, as not only the receiver (Rx) of one reader can be interfered by the other reader transmitters (Tx), but also the tags within the reading zones of more than one readers cannot decode the reader commands correctly when they broadcast at the same time.

As shown in FIG. 1, the reading zone of a first reader (Reader 1) may only cover Tag Group 1, missing Tag Group 2. Adding Reader 2 to cover Tag Group 2 may cause interference (e.g., Reader 1 Rx can be interfered by Reader 2 Tx), and tags in both reading zones cannot properly decode the reader commands. Even in tag-talk-first ("TTF") and tag-talk-only ("TTO") schemes, with the reader playing a smaller role in streamlining the tag response sequence, R2RC remains a serious concern to the system operation. Additional delay caused by tag TDMA embedded inside reader TDMA will also limit the tag sampling rate for tracking moving tags in real time.

BRIEF SUMMARY OF THE DISCLOSURE

In a first aspect, the present disclosure provides an RFID system using a collaborative reader code division multiple access ("CDMA") protocol. In this way, the RFID system provides synchronous tag access for all readers within range. The tag can distinguish the downlink commands from multiple readers simultaneously and then formulate a response accordingly.

The present disclosure provides a collaborative reader CDMA scheme in a harmonic RFID system, which can solve the reader-to-reader collision ("R2RC") problem and significantly enhance the read yield rate for tags in the overlapped reading zone. The reduction in the read failure rate in the collaborative reader CDMA scheme is much more than the failure rate product of the individual readers in the complex multi-path scenarios by exploiting the channel characteristics and the failure correlation. This improvement can fundamentally benefit the reliability in the logistic RFID applications.

The presented reader CDMA is demonstrated in a simple experimental prototype to verify R2RC resolution and read yield improvement. The two-reader collaborative CDMA scheme achieved below $10^{-5}$ in the read failure rate when individual readers had 0.05-0.2 failure rates in the complex multi-path scenarios due to rich channel exploitation and anti-correlation in the failure incidences.

DESCRIPTION OF THE DRAWINGS

For a fuller understanding of the nature and objects of the disclosure, reference should be made to the following detailed description taken in conjunction with the accompanying drawings, in which:

FIGS. 8(a)-8(b) are illustrations of an exemplary reader CDMA protocol. (a) The information for the readers to be sent to the tag. (b) The orthogonal CDMA codes of each reader. (c) The baseband waveform of each reader and a possible baseband waveform received by a tag when the received signal strength (RSS) from the two readers is similar.

DETAILED DESCRIPTION OF THE DISCLOSURE

In a first aspect, the present disclosure provides collaborative radiofrequency identification (RFID) readers that employ code division multiple access (CDMA) encoding to simultaneously broadcast to and read responses from tags in an overlapping reading zone with improved data synchronization and read yield rates. In some embodiments, a harmonic backscattering scheme is used to enable the system to have a much higher signal-to-noise ratio (SNR) and sensitivity, while the reader CDMA protocol can be integrated with an initial TDMA polling process or alternative tag CDMA scheme.

Figure 7:
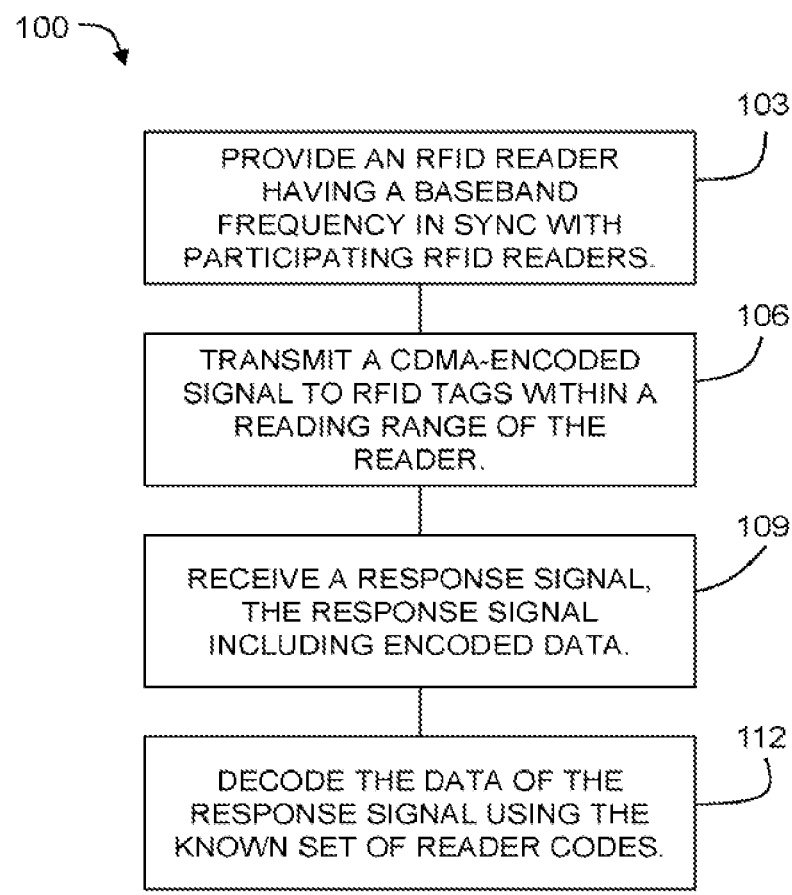
FIG. 7 is a chart showing a method according to another embodiment of the present disclosure.

In an embodiment, a method 100 for collaborative RFID is provided (see, e.g., FIG. 7). An RFID reader is provided 103. The provided 103 reader has a baseband frequency and is a member of a group of participating RFID readers. Each participating RFID reader is synchronized to the baseband frequency. For example, each participating RFID reader may have a common baseband clock, CLKbb. The provided 103 reader is assigned an orthogonal code with which it can produce a CDMA-encoded signal. Each participating RFID reader is assigned a code, and each of the codes are orthogonal to the other codes (mutually orthogonal). The set of all mutually-orthogonal codes for the participating RFID readers is known to each of the participating RFID readers, including the provided 103 RFID reader.

The provided 103 RFID reader is used to transmit 106 a CDMA-encoded signal to all RFID tags within a reading range of the RFID reader (i.e., broadcasting the CDMA-encoded signal). As will be further described below, a tag within range of the broadcast signal will decode the signal and may send a response. The method 100 includes receiving 109 a response signal from an RFID tag. The received 109 response signal will include data encoded with a code of a participating RFID reader. The RFID reader will decode 112 the data of the received 109 response using the appropriate code of the known set of mutually-orthogonal code. For example, in some cases, the received 109 response signal will include data encoded with the code of the provided 103 RFID reader, which in other cases the received 109 response signal will include data encoded with the code of another participating RFID reader. In this way, any RFID reader of the participating system will be able to read signals generated by tags in response to the broadcast of any RFID reader of the participating system.

In some embodiments, the method 100 include transmitting 115 a polling signal to RFID tags within the reading range, the polling signal comprising the set of the orthogonal codes of all participating RFID readers.

Figure 4:
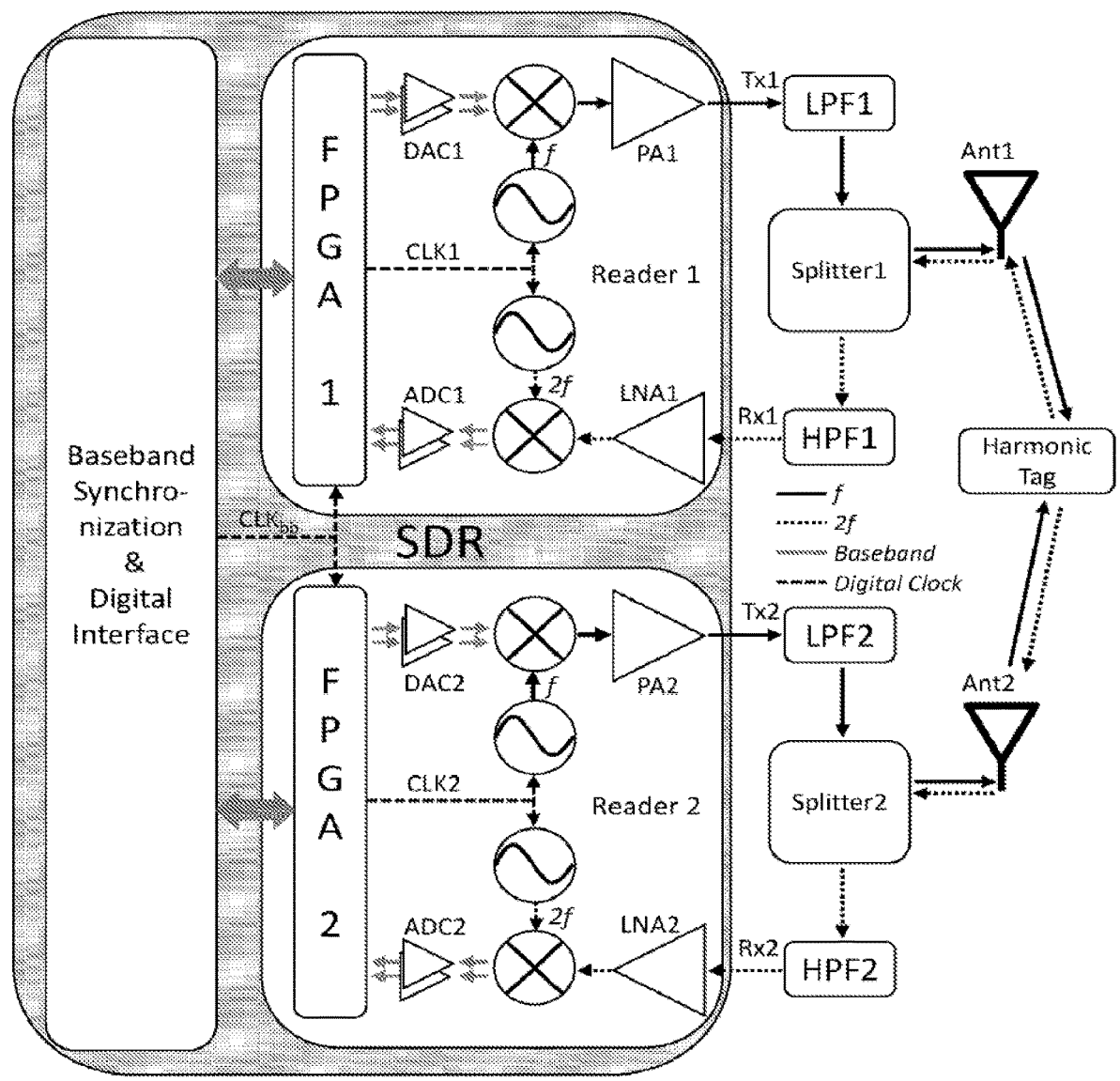
FIG. 4 is a diagram of an exemplary harmonic RFID system according to an embodiment of the present disclosure and having two CDMA readers configured by a software-defined radio (SDR) platform (showing where Reader 1 and Reader 2 can simultaneously access a harmonic tag within an overlapped reading zone).

In a more particular non-limiting example used to illustrate an embodiment, at least two RFID readers are provided. Each of the at least two RFID readers have a synchronized baseband frequency. For example, the diagram of FIG. 4 depicts a common baseband clock, CLKbb, received by a first RFID reader (Reader 1) and a second RFID reader (Reader 2). Each RFID reader is assigned a unique code which is orthogonal to the codes assigned to the other RFID readers. The set of mutually-orthogonal codes for all of the RFID readers (of the at least two RFID readers) is known to each RFID reader.

Data is encoded using the orthogonal code assigned to the first RFID reader. In this way a first CDMA-encoded signal is can be produced using the orthogonal code of a first RFID reader of the at least two RFID readers. The first CDMA-encoded signal is transmitted using the first RFID reader. The signal may be transmitted to an RFID tag. The same or different data may also be encoded using the orthogonal code assigned to a second RFID reader to produce a second CDMA-encoded signal. The second CDMA-encoded signal may be transmitted by the second RFID reader. The second CDMA-encoded signal may be transmitted by the second RFID reader at the same time or a different time as the first CDMA-encoded signal is transmitted by the first RFID reader. Additional CDMA-encoded signals may be produced and transmitted using additional RFID readers and the corresponding orthogonal codes.

A response signal may be received from the RFID tag. For example, the RFID tag may, upon receiving the signal transmitted from the first RFID receiver, transmit a response signal (for example, the tag may backscatter a signal). Such a response signal may be received at an RFID reader, such as, for example, the second RFID reader. The response signal includes data encoded with the orthogonal code of one or more RFID readers, such as, for example, the orthogonal code of the first RFID reader. Because each RFID reader has available the set of mutually-orthogonal codes, the receiving RFID reader is able to decode the data of the response signal regardless of which orthogonal code the data was encoded with. In the example where the response signal is received by the second RFID reader and encoded with the orthogonal code of the first RFID reader, the second RFID reader may decode the data of the response signal. Furthermore, the response signal may include data encoded by, for example, the orthogonal codes of the first and second RFID reader and decode data using both codes. In this way, regardless of which reader receives a response signal from an RFID tag, the data relevant to each reader may be decoded and processed accordingly.

Figure 5:
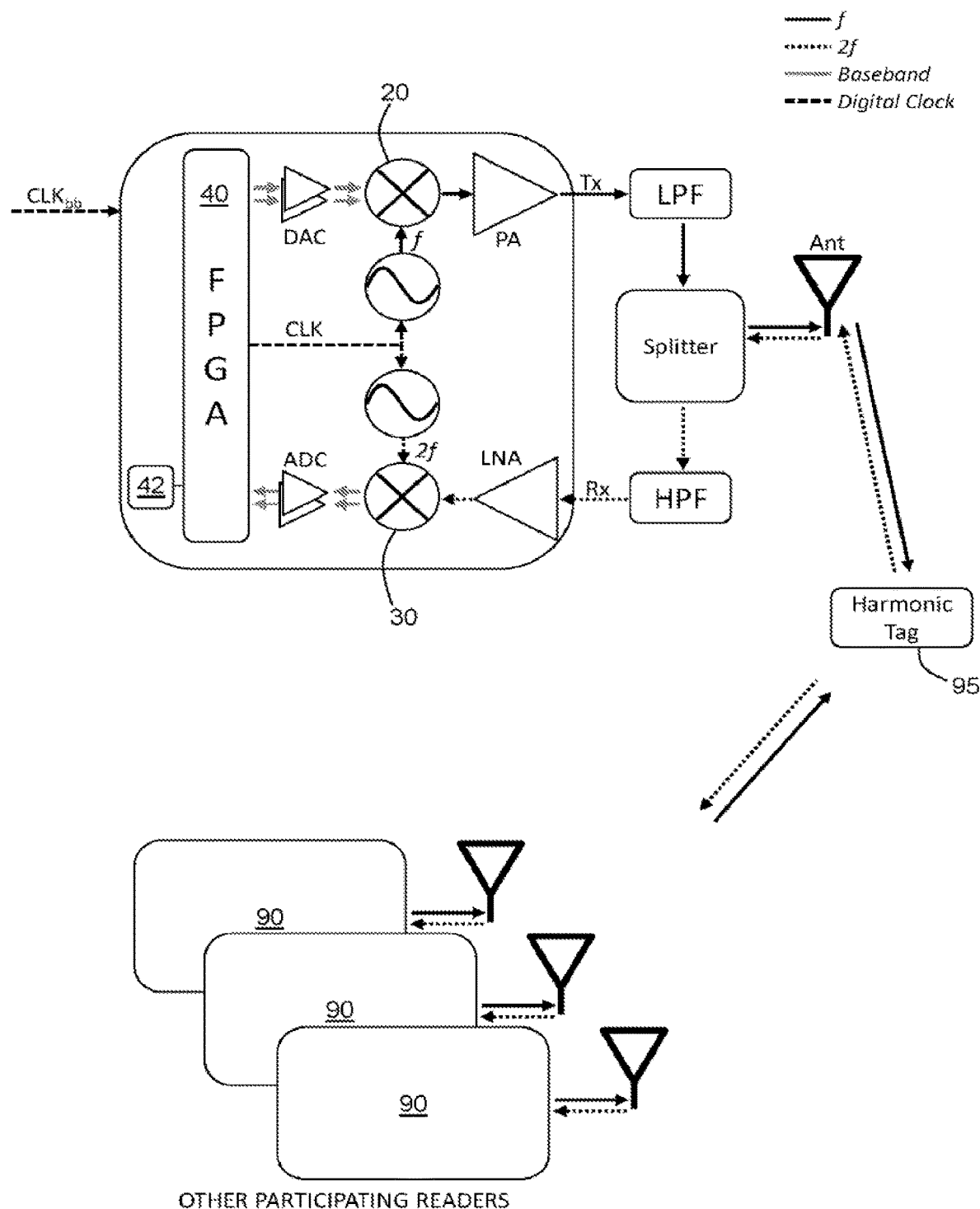
FIG. 5 is a diagram of an exemplary RFID reader according to another embodiment of the present disclosure and shown with additional readers and a harmonic tag.

In another aspect, a collaborative RFID reader 10 is provided (see, e.g., FIG. 5). The RFID reader 10 includes a transmitter (Tx) 20 having a Tx baseband frequency modulated on a Tx carrier frequency. The Tx baseband frequency is configured to be synchronized to a Tx baseband frequency (i.e., Tx baseband frequencies, as the case may be) of one or more additional RFID readers 90. The Tx baseband frequencies may be synchronized by, for example, provision of a common baseband clock signal or a baseband clock retrieval module. The RFID reader 10 further includes a non-transient memory 42. The non-transient memory 42 may be any type suitable for electronic storage of data. Some examples of non-transient memory 42 include dynamic or static random access memories, flash memories, electronically-erasable programmable memories, or the like. The non-transient memory 42 is configured to store a unique orthogonal code assigned to each RFID reader 10,90 within the collaborative reader CDMA scheme.

The RFID reader 10 includes a processor 40 that is in electronic communication with the transmitter 20 and the non-transient memory 42. The processor 40 may be, for example, a field-programmable gate array (FPGA), a microprocessor, an application-specific integrated circuit (ASIC), or the like, or combinations of these and/or other components. The processor 40 is programmed to encode data according to the assigned orthogonal code. In this way, a first CDMA-encoded signal is produced. The processor 40 transmits the first CDMA-encoded signal using the transmitter 20. For example the first CDMA-encoded signal may be transmitted to an RFID tag 95 within range (the "reading range") of the RFID reader 10.

The RFID 10 reader may also include a receiver (Rx) 30 in electronic communication with the processor 40. The receiver 30 has an Rx baseband frequency, which is synchronized to the Tx baseband frequency. The Rx carrier frequency may be different than the Tx carrier frequency. For example, the Rx carrier frequency may be twice the Tx carrier frequency (second harmonic). In such embodiments, the processor 40 may be further programmed to receive a response signal from an RFID tag 95. The response signal includes encoded data, which may be encoded using the orthogonal code of the RFID reader 10 or orthogonal codes of the one or more additional participating RFID readers 90. Because the non-transient memory 42 has stored the set of mutually-orthogonal codes for each reader 10,90, the RFID reader 10 can decode the encoded data of the response signal using the assigned orthogonal code of the RFID reader 10 and/or one or more codes of the set of mutually orthogonal codes.

In another aspect, a method for collaborative RFID reading is provided. At least two RFID readers are provided. For example, multiple RFID readers may be provided. The multiple RFID readers have a synchronized baseband frequency. For example, the diagram of FIG. 4 depicts a common baseband clock, CLKbb, received by a first RFID reader (Reader 1) and a second RFID reader (Reader 2). Each RFID reader is assigned a unique code which is orthogonal to the codes assigned to the other RFID readers. The set of mutually-orthogonal codes for all of the RFID readers (of the participating RFID readers) is known to all participating RFID readers. In this way, CDMA-encoded signals are produced. The CDMA-encoded signals are transmitted to all RFID tags within reading range of the RFID readers.

Response signals are received from the RFID tags. For example, the RFID tags may, upon receiving the transmitted CDMA-encoded signals, transmit response signals (for example, the tags may backscatter signals). Such response signals may be received at one or more of the participating RFID readers. Because each RFID reader has available the set of mutually-orthogonal codes, the receiving RFID readers are able to decode the data of the response signals regardless of which orthogonal code the data was encoded with.

The following discussion provides additional embodiments, including prototypes, and discussion of the theory of operation, all of which are intended to be non-limiting and provided for the purpose of further illustrating the disclosure.

Reader CDMA in a Harmonic RFID System

Figure 1:
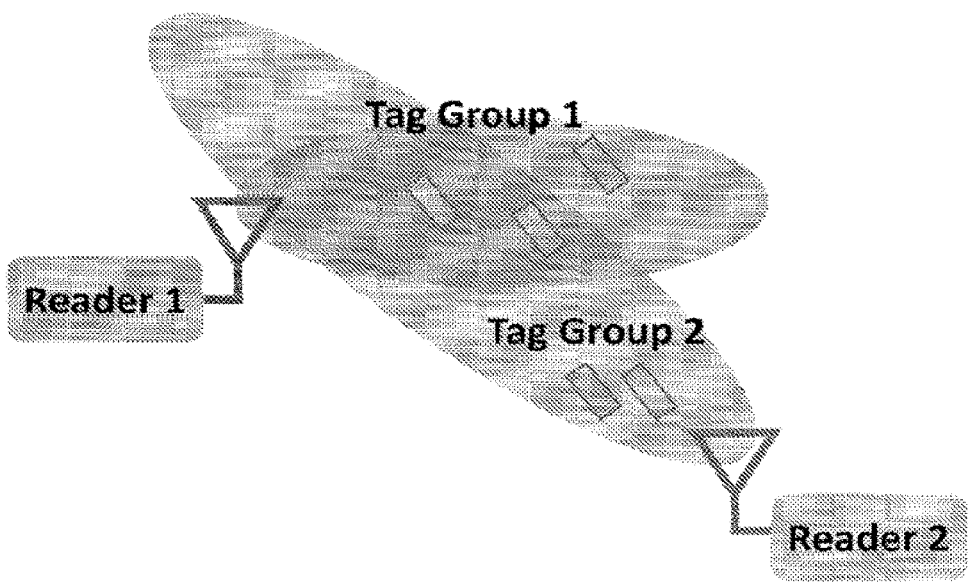
FIG. 1 is a diagram depicting how two nearby RFID readers can suffer from reader-to-reader collision ("R2RC") for tags within the overlapped reading zone as well as possible reader receiver jamming.
Figure 2:
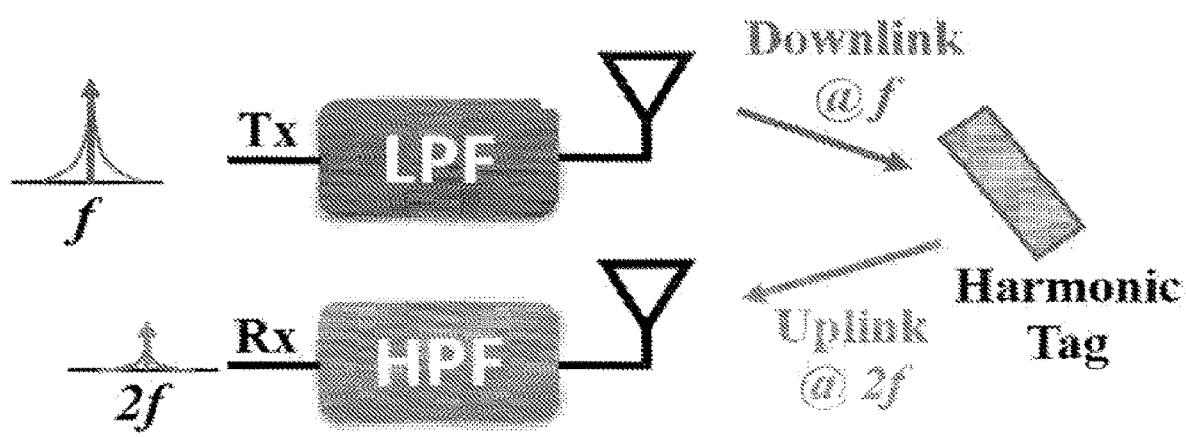
FIG. 2 is a schematic of a harmonic RFID system. LPF: low-pass filter; HPF: high-pass filter.

In a conventional RFID system employing the EPC protocol, where the downlink and uplink signals share the same frequency band, poor isolation by the duplex circulator with direct leakage from reader Tx to Rx as well as by the antenna reflection from imperfect impedance match and nearby large objects renders low SNR at the reader Rx. For applications that rely on accurate amplitude and phase demodulation of the backscattered signal to retrieve, for example, location and vital signs in addition to the digital tag identification (ID), the conventional EPC scheme cannot provide feasible performance. Embodiments of the present disclosure may thus use a harmonic RFID system, for example, as shown in FIG. 2, which utilizes the second harmonic to isolate the downlink (reader-to-tag) and uplink (tag-to-reader) signals and has been demonstrated for indoor localization, tag CDMA for simultaneous access, and vital-sign monitoring. The downlink signal from the reader Tx at $f$ goes through a low-pass filter (LPF) to broadcast to the harmonic tag which harvests the RF energy, powers up, converts part of the RF signal at $f$ to the $2^{nd}$ harmonic at $2f$, and finally backscatters to the reader Rx at $2f$ in the uplink signal. A high-pass filter (HPF) at the reader Rx provides high isolation (sufficient separation) between the downlink self-interference at $f$ and the received harmonic signal at $2f$. The reader Rx SNR is hence not limited by the high phase noise skirt of its own Tx. SNR and sensitivity of the reader Rx can thus be greatly improved.

Figure 3A:
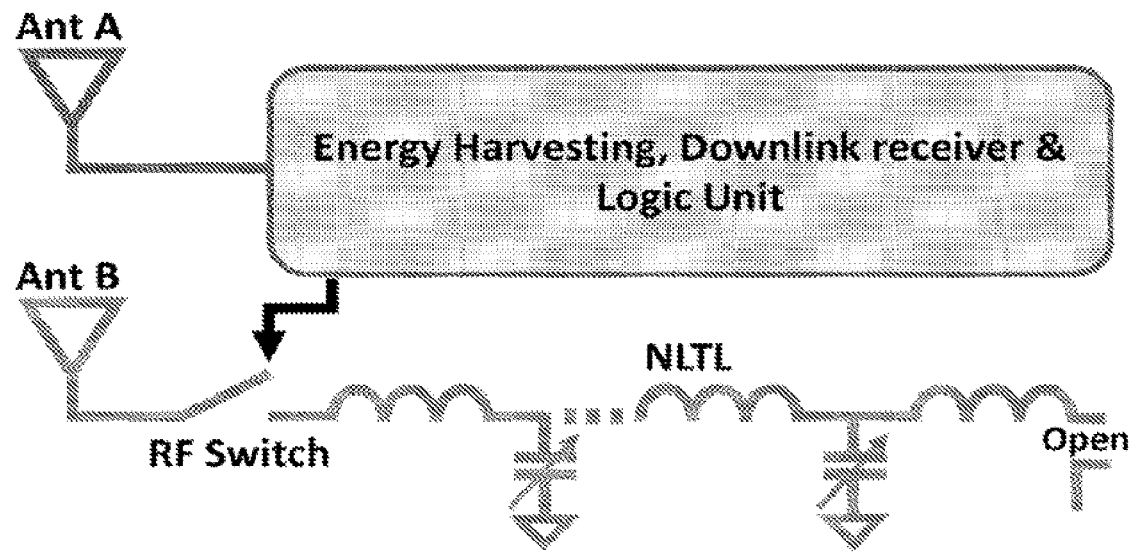
FIG. 3(a) is a schematic of a harmonic RFID tag with harmonic generation by a reflective nonlinear transmission line ("NLTL") and having an RF switch for uplink modulation.
Figure 3B:
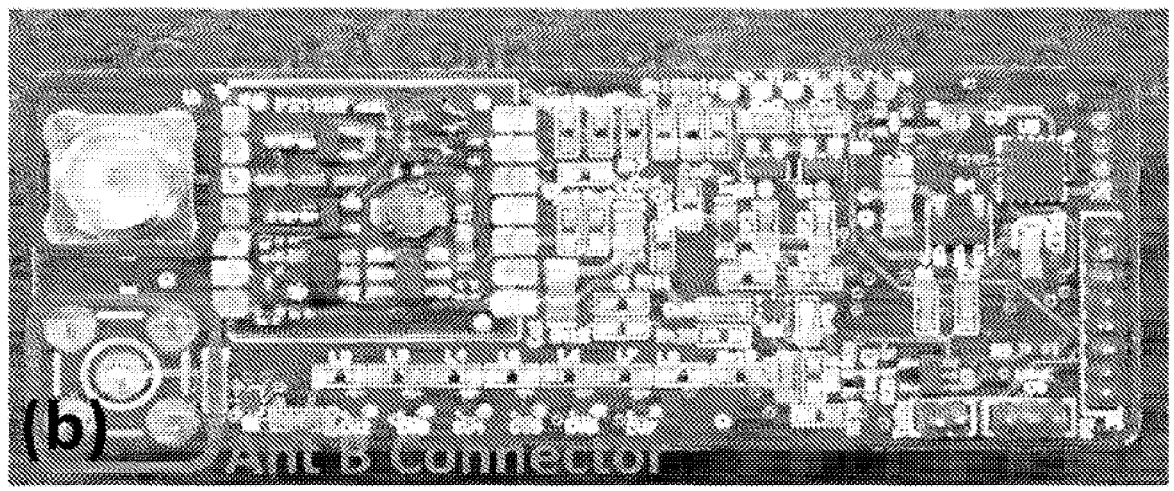
FIG. 3(b) is a PCB prototype of the harmonic tag of FIG. 3(a).

An exemplary harmonic tag prototype is shown in FIG. 3(a). The tag harvests the downlink RF energy through antenna A (Ant A). After the tag powers up, the tag Rx demodulates the reader command from the downlink and the logic unit responds according to the air protocol. Antenna B (Ant B) converts part of the downlink signal to $2f$ by the reflective nonlinear transmission line (NLTL). The harmonic signal is then backscattered from Ant B to the reader Rx. An RF switch in front of the NLTL may be provided for the uplink on-off keying (OOK) modulation. The PCB prototype of an exemplary harmonic tag is shown in FIG. 3(b), which is based on the WISP platform. Because the tag is passive, its size and packaging are not limited by the battery or the recharging circuits. Thus, the PCB prototype can be readily adapted to integrated circuits (IC) and printed antennas to reduce the overall size.

As shown in the exemplary embodiment of FIG. 4, two harmonic readers are configured by a software defined radio (SDR, Ettus X310, UBX 160) to demonstrate how collaborative reader CDMA can resolve R2RC and improve read yield rates. The given SDR platform provides two pairs of Tx/Rx, which are designed as two coherent but independent harmonic readers with synchronized basebands. The FPGA in Reader I generates the baseband signal transformed by the digital-to-analog converter I (DACI) to the intermediate frequency (IF), which is further upconverted by the mixer to the fundamental RF band at $f$. The signal is then amplified by the power amplifier (PAI) as the Tx1 signal. The low-pass filter I (LPFI), splitter!, and high-pass filter I (HPFI) forms the broadband duplexer for Antenna I (Ant1) with reasonable insertion loss compromise. The signal flow of the duplexer is shown as the solid black arrows for the fundamental frequency signal ($f$) and the dotted-line arrows for the $2^{nd}$ harmonic signal ($2f$). The harmonic tag responds to Reader I by Ant1, going through splitter! and HPFI to Rx1. The signal is amplified and down-converted by the local oscillator (LO) to the IF band, and then sampled by the analog-to-digital converter I (ADCI), which is then demodulated by the FPGA to retrieve the tag OOK information. Another channel of the SDR is configured as Reader 2, which operates similarly but independently to Reader 1.

The LO synthesizers for $f$ and $2f$ are driven by the same clock source as CLKI for Reader I and CLK2 for Reader 2. This clock distribution makes the harmonic reader coherent, and accurate phase of the backscattered signal can be retrieved for estimation of time of flight (ToF). However, for protocols such as the pulse interval encoding (PIE) used in the EPC downlink, CLKI and CLK2 are not required to be synchronized if the related carrier phase information between Reader I and Reader 2 is not essential. However, to realize CDMA on the multiple readers, the baseband signals of each reader should be synchronized (CLKbb) with precise bit alignment to maximize the orthogonality among chip codes.

Figure 6:
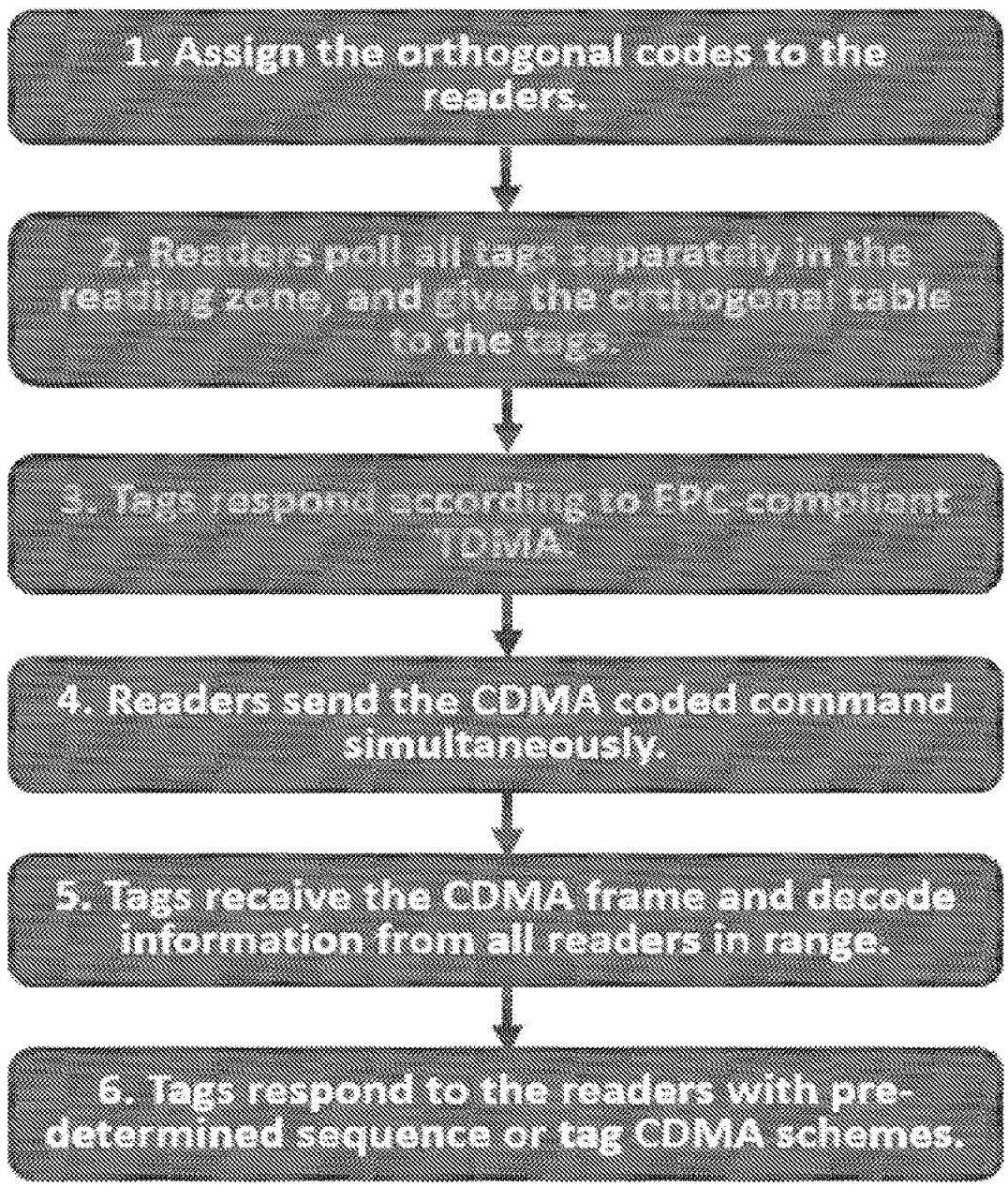
FIG. 6 is a flow chart showing an exemplary collaborative reader CDMA protocol.

An exemplary protocol conducted on the CDMA readers is described in FIG. 6. First, through initial reader coordination, each reader will be assigned a unique chip code, and all readers within the collaborative CDMA scheme will have the full chip code table. Then each reader will poll as well as register its chip code to all tags within the reading range. For each reader polling procedure, the tags can respond to the reader by an EPC TDMA protocol or the alternative tag CDMA protocol. After all readers finish the polling process, the readers send the CDMA coded commands simultaneously to access all the tags. Each tag receives and demodulates the CDMA coded frame, retrieving the information from each reader within the feasible range and responding to the readers accordingly.

Figure 8:
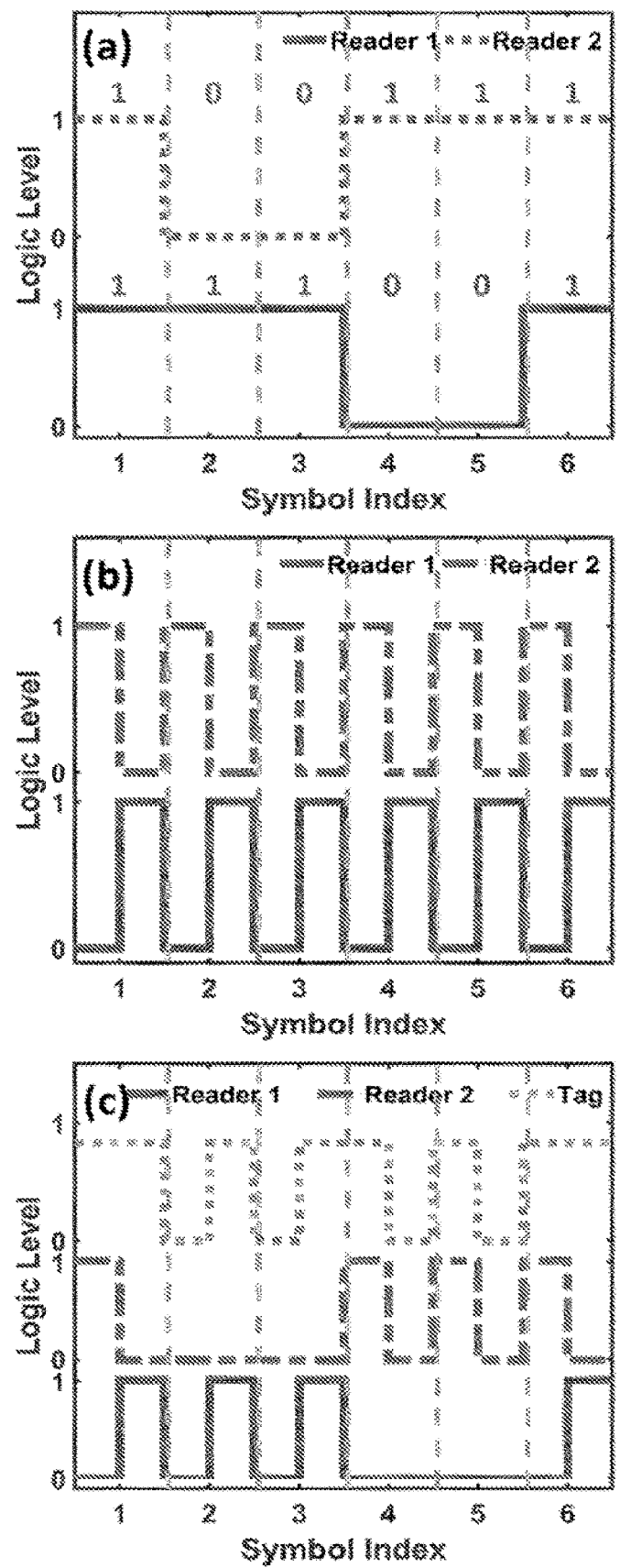

The reader CDMA modulation and demodulation scheme is illustrated in FIG. 8(a), where Reader 1 prepares to send (111001)2 represented by the solid line, and Reader 2 to send (100111)2 represented by the dashed line. In this illustrative and non-limiting example, 1 bit per symbol is considered here. As shown in FIG. 8(b), Reader 1 has the CDMA chip code (01)2 and Reader 2 the code (10)2. In FIG. 8(c), the solid line is the baseband signal for Reader 1, and the dashed line is for Reader 2. After CDMA chip code injection, the baseband has 2 bits per symbol. The baseband signals of these two readers are synchronized and fed to their own DACs simultaneously. After the up-conversion of the mixers, the RF signals of the two readers may be transmitted to the tags at the same time, and added together in the communication channel to reach the tag Rx in their respective reading zones. The dotted line in FIG. 8(c) represents a simulated baseband signal received by a tag that is in an overlapped reading zone where the received signal strength (RSS) from both readers is assumed to be similar for illustrative convenience. To demodulate the information from each reader, the tag accesses the chip code table established during the polling stage, multiplies the selected code with the received baseband, and then operates all the bits (2 bits here) within the same symbol with logical OR. The information corresponding to the selected chip code may then be demodulated. For example, the baseband signal received by the tag may be multiplied with the orthogonal code (10)2 of Reader 2 to obtain (100000101010)2. After the OR operation in each symbol, the original information of (100111)2 may be retrieved from Reader 2.

Experiments and Data Analyses

Figure 9:
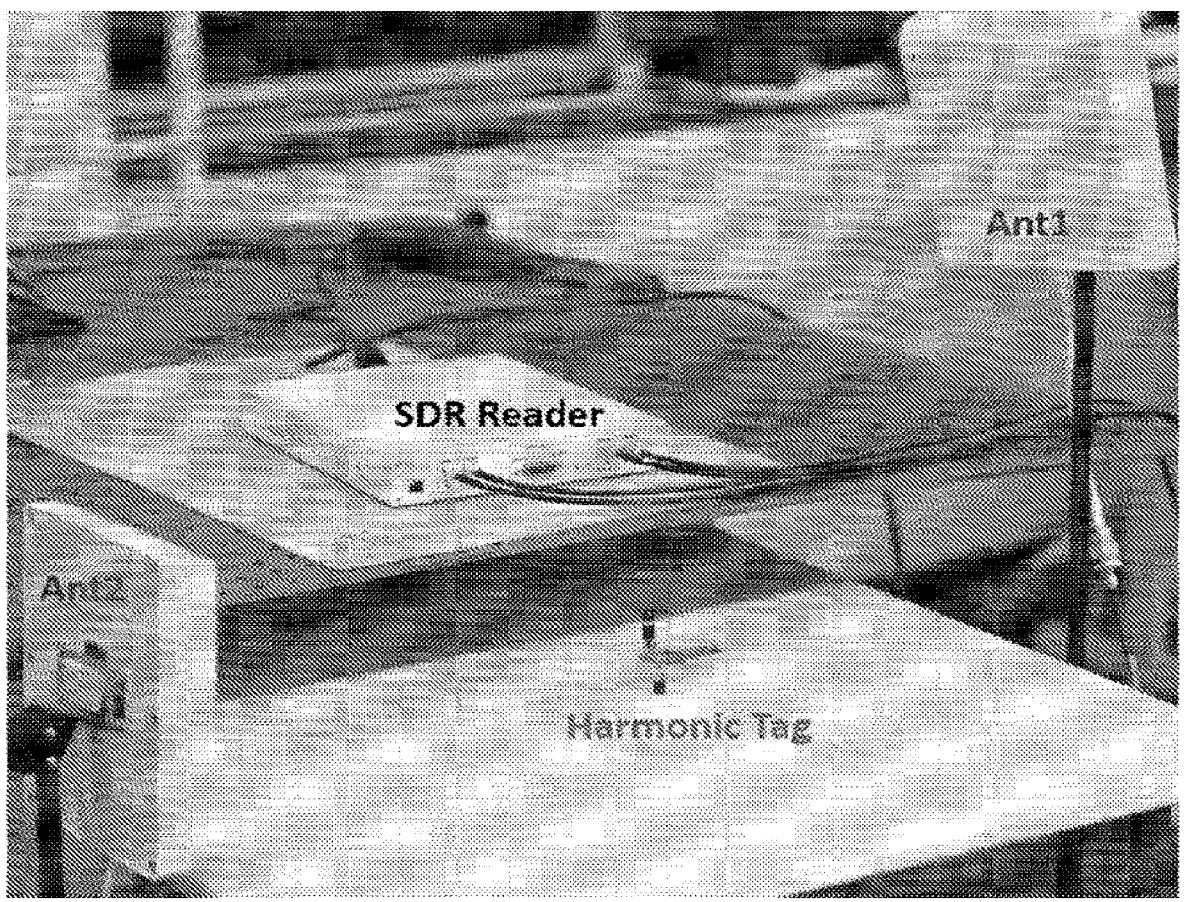
FIG. 9 shows an exemplary experimental setup where an SDR module is configured as two harmonic readers operating the collaborative CDMA protocol implemented by LabVIEW. A harmonic tag stands on a movable foam substrate for convenience. The ranges of the Ant1 and Ant2 are just for convenient picture illustration. Experiments were conducted with both readers at about 2 meters away from the tag.

FIG. 9 shows the experimental setup for an exemplary collaborative reader CDMA for verification. In this non-limiting example, an SDR module is configured as two independent harmonic readers connected to Ant1 and Ant2, respectively. A harmonic tag stands on a foam and moves within the reading zones of both readers. The reader antennas are on average at about 2 meters away from the tag. The distances of Ant1 and Ant2 in FIG. 9 are non-limiting and provided for clear picture presentation.

Figure 10:
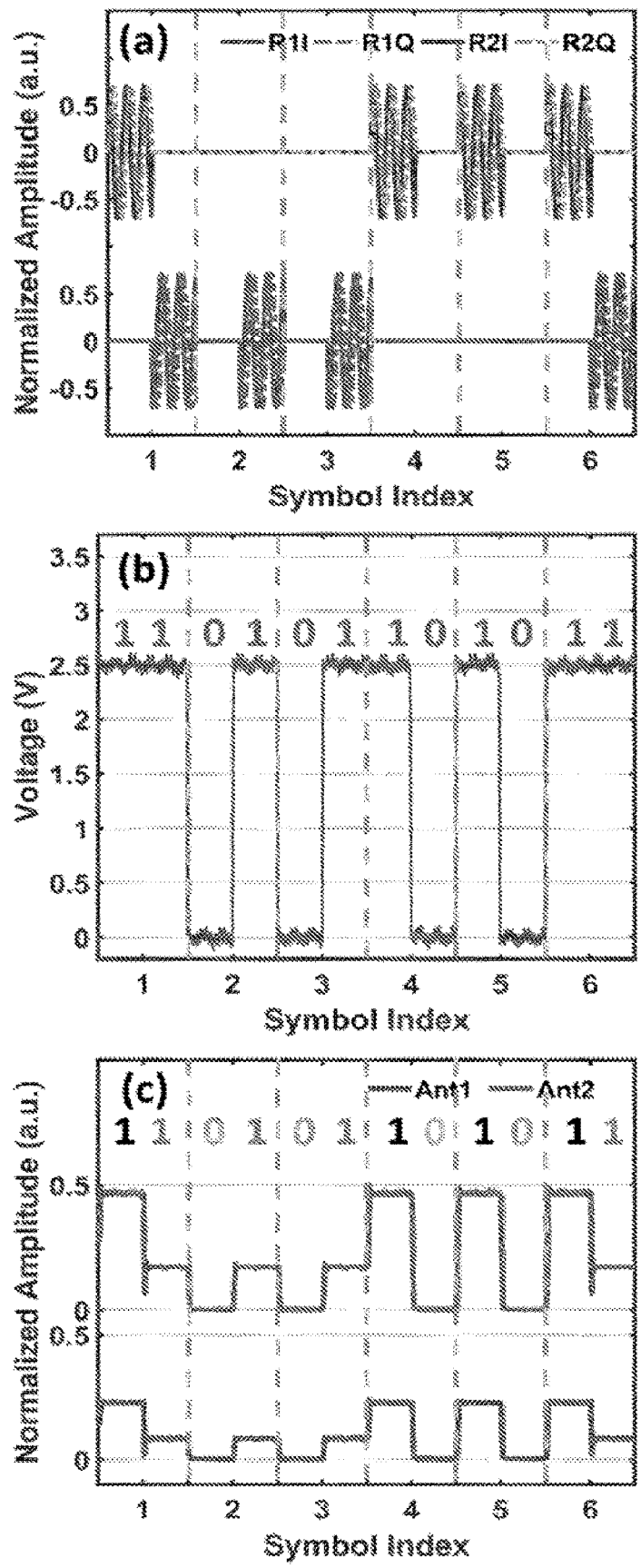
FIGS. 10(a)-10(c) show details of the experimental prototype for reader CDMA: (a) The modulated digital IF signals of the two readers. The curves are RII (lower solid line): the in-phase signal of Reader 1, R1Q (lower dashed line): the quadrature signal of Reader 1, R2I (upper solid line): the in-phase signal of Reader 2, and R2Q (upper dashed line): the quadrature signal of Reader 2. (b) The baseband received at the tag. (c) The baseband received from Ant1 of Reader 1 and Ant2 of Reader 2.

Reader I and Reader 2 utilize an embodiment of the present collaborative CDMA protocol to access the tag simultaneously. In this experiment, the same reader information and chip code assignment shown in FIG. 8 were used. The experimental setup used a bit rate of 400 kbps (kilobits per second), although other baseband bandwidth will not change our observation significantly. The IF frequency was set at I MHz, so each bit spanned 2.5 periods of the IF cycle. The sampling rates of the reader Rx ADC and Tx DAC were both at 20 MSps (mega-symbols per second), where the waveform of each bit was represented by 50 points to provide sufficient equalization and timing accuracy. As shown in FIG. 10(a), the lower solid curve and the lower dashed curve are the in-phase and quadrature (1/Q) signals of Reader I denoted by R1I and RI Q, while the upper solid curve and the upper dashed curve are I/Q signals of Reader 2 denoted by R2I and R2Q, respectively. The basebands of the two readers were synchronized with the SDR, and the bits were aligned and converted by their own DACs to the IF band, which were further up-converted to the downlink RF signal at 950 MHz to be transmitted to the tag simultaneously. The tag Rx was designed as the low-pass filter to detect the envelope of the downlink signal. After the comparator, the logic level was equalized, as shown in FIG. 10(b). Based on the orthogonal code table and the CDMA decoding method described above, the tag demodulated the information from Reader I as (111001)2 and from Reader 2 as (100111)2 correctly.

The tag then backscattered the $2^{nd}$ harmonic as the uplink signal to the readers. In this experiment to demonstrate the collaborative reading properties, the tag replayed what was received from all readers in range, but the uplink can be alternatively operated with tag CDMA protocol and tag-specific ID information for multi-tag access as well. The demodulated baseband signals from the tag to the two readers received by Ant1 (lower) and Ant2 (upper) are shown in FIG. 10(c). Because the distance from the tag to Ant1 and Ant2 was about the same here, the amplitude envelopes were similar, and the waveform amplitudes were normalized to the full scale of the ADC. The logic values are denoted as the digits in FIG. 10(c), which are (110101101011)2. Because the tag just replayed the signals from both readers on the $2^{nd}$ harmonic, each reader could receive the original information from both readers. For example, in FIG. 10(c), the baseband (upper) received by Ant2 can be decoded with the chip code of either reader, where the logic I's by the black color are attributed to Reader 2, and the gray I's are to Reader 1. The same case applies to the baseband signal received by Ant1 from the tag. As the reader information can be processed by the tag and relayed to other readers, the multiple readers can be viewed as a high channel-efficiency multi-static reader system.

One of the most important applications in the multi-static reader system is the collaborative reading under complex multi-path scenarios, because the channels are now not limited to the individual reader-tag-reader path. The multi-static n-reader system yield in the channel condition C can be described as the matrix A(C):

$$A(C) = \begin{pmatrix} a_{11} & a_{1n} \\ \vdots & \vdots \\ a_{n1} & a_{nn} \end{pmatrix} \quad (1)$$

The read yield for a specific tag can be defined by aji (i, j=1,2, ..., n) for the downlink signal from Reader i Tx and uplink signal to Reader j Rx. Under a given channel condition C, if the tag information can be correctly demodulated, aji=1, otherwise aji=0. For the single reader system, the system read yield A(C) is just the incidence of $\alpha_{11}$ under various channel conditions C, which highly depends on the relative range, antenna orientation alignment, multi-path, and RF scattering object placement. In a multi-static reader system without the proposed CDMA protocol, the read yield can be calculated as the OR operation of the diagonal elements of A(C), which means at least one reader should successfully read the tag. The static read yield in this condition is also equivalent to one reader with multiple TDMA antennas in the current EPC operations. However, one can see that A(C) is not fully utilized, and the proposed CDMA protocol can further improve the system yield by exploiting the OR operation of all elements in A(C). In a complex multi-path ambient, the incidence of aji=0 can often be anti-correlated with those of other elements in the consideration of antenna orientation alignment, which can make the system read failure probability significantly lower than the product of individual reader failure probability.

Figure 11:
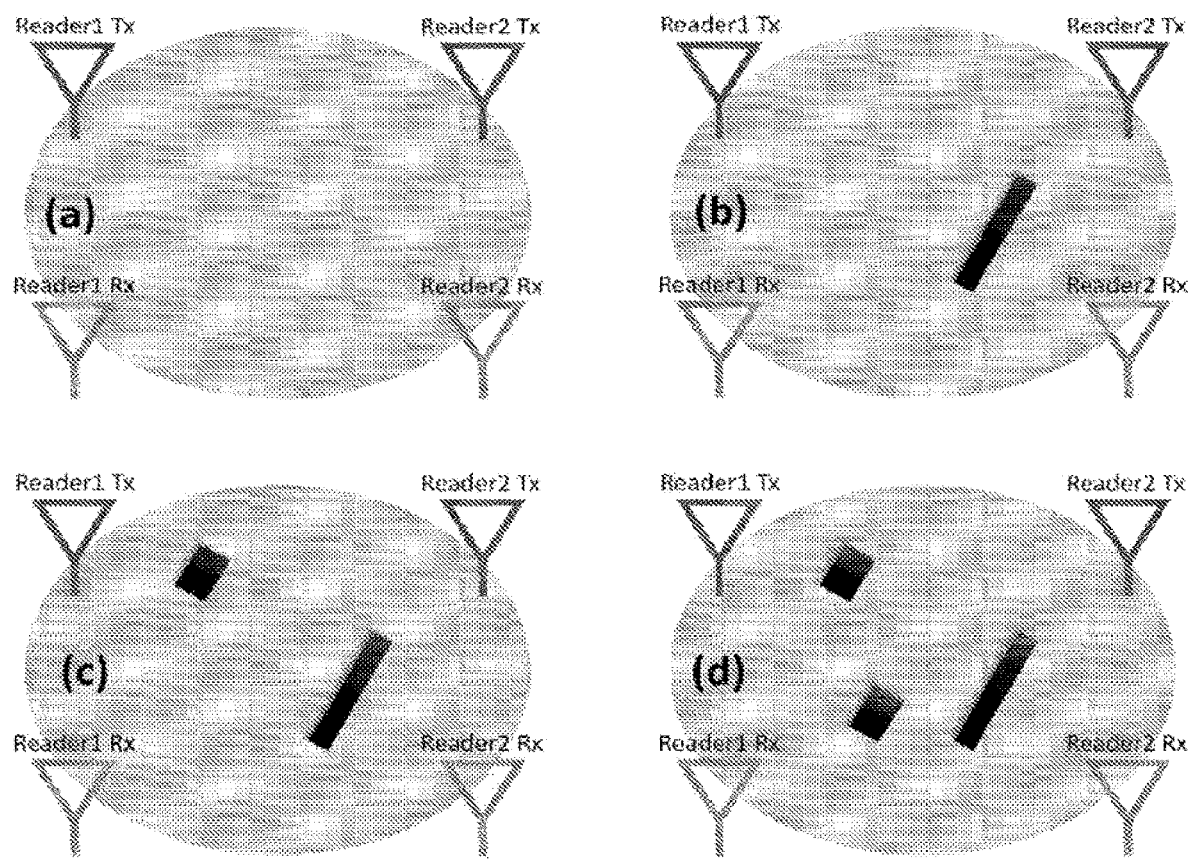
FIGS. 11(a)-11(d). Experimental scenarios with various scatterers in the reading zone. (a) Both readers maintain direct line-of-sight to a tag when it moves and rotates randomly within the overlapped reading zone. (b-d) Large scatterers are successively added to the reading zone to create complex multi-path scenarios.
Figure 12A:
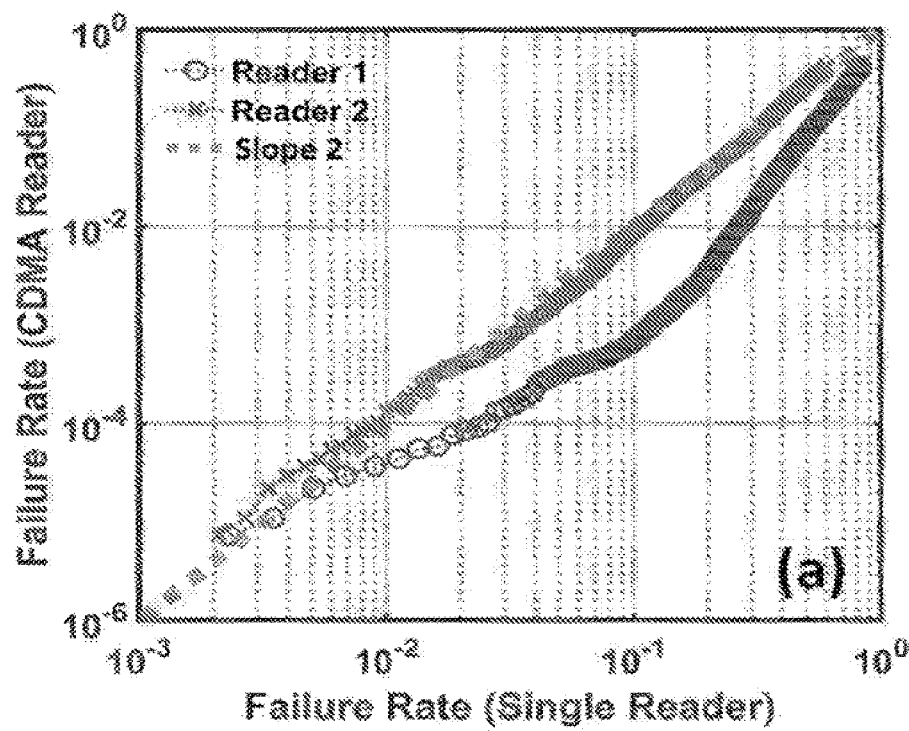
FIGS. 12(a)-12(d). Experimental benchmarks of the failure rates in the single reader scheme and the collaborative CDMA reader scheme for the channel conditions in FIGS. 11(a)-11(d). The dotted line shows the slope of 2 in the log-log plot, which corresponds to the case of uncorrelated individual reader failures and little reader collaboration, which is mostly valid for both curves in (a). Slopes higher than 2 in (b)-(d) suggest anticorrelation in individual reader failures and rich reader collaboration. Failure rates of below $10^{-5}$ were achieved using collaborative reader CDMA even though individual readers have failure rates between 0.05 and 0.2.
Figure 12B:
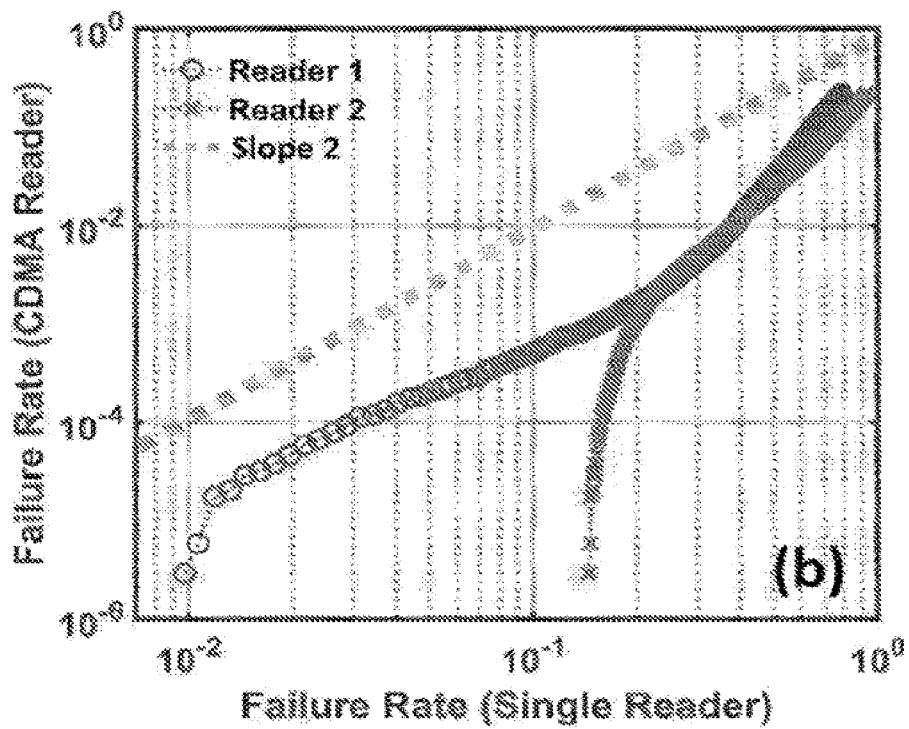
Figure 12C:
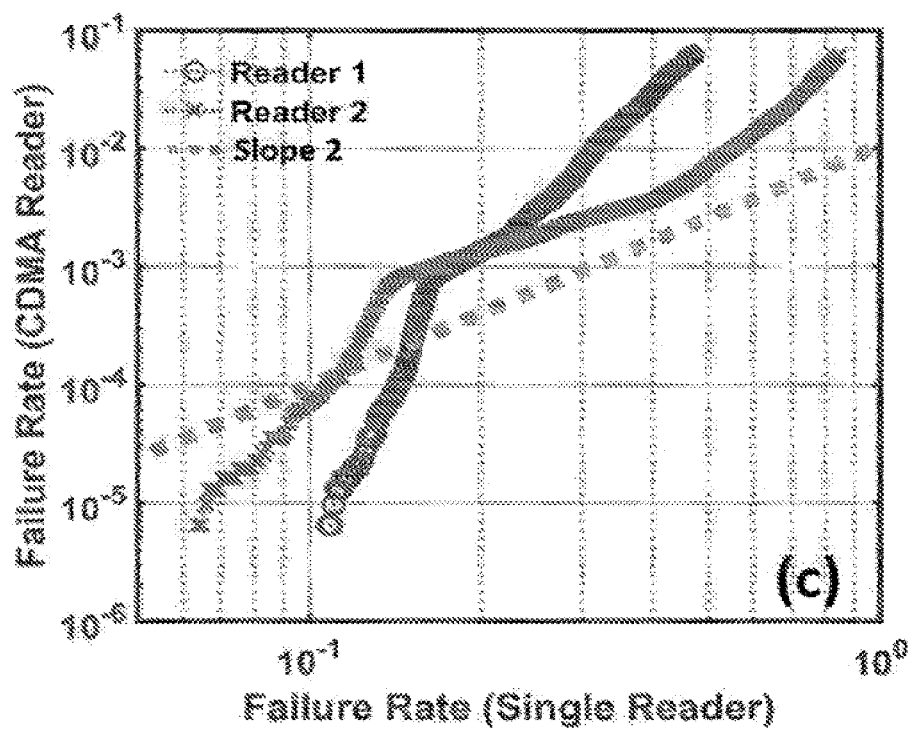
Figure 12D:
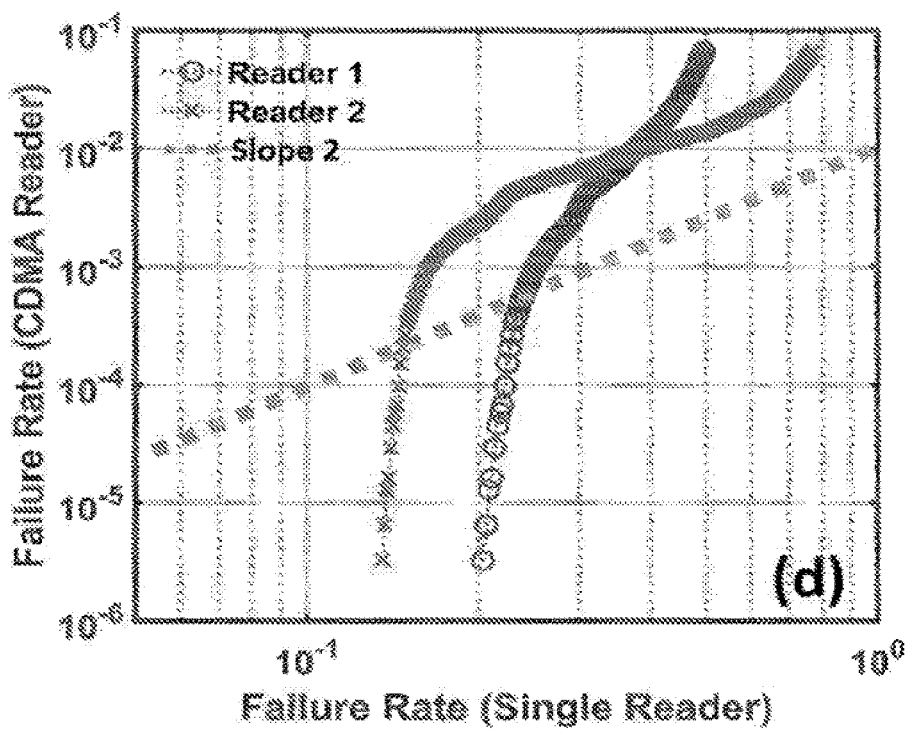

For example, four readers will have four Tx/Rx pairs. With the collaborative reader CDMA protocol, all four reader Tx can poll the tag simultaneously. The tag can then formulate the response accordingly with the knowledge of all reader information, which can be received by all four reader Rx. Hence, the channel information can be fully utilized to serve the various purposes in specific applications. An experimental illustration is shown in FIGS. 11(a)-11(d) with two readers in a multi-static Tx/Rx indoor setup. The four multi-path scenarios are created with different scatterers (black rectangles) placed in the overlapped reading zone (gray oval). In FIG. 11(a), both readers maintain direct line-of-sight (LoS) to the tag when it moves and rotates randomly within the reading zone. In FIGS. 11(b-d), large scatterers are successively inserted into the reading zone to increase the multi-path complexity.

FIG. 12 shows the ample read yield improvement of the collaborative reader CDMA scheme over that of the individual readers operating simultaneously, especially in the complex multi-path scenarios. Notice that Rx.jamming between the two readers is removed in all cases due to the use of harmonic backscattering and reader CDMA The reader Tx power is continuously adjusted to collect changing failure rates in various tag positions and orientations. More than 300,000 reading incidences are collected in each set of experiment data. In FIGS. 12(a)-12(d), the curves delineated with o markers and x markers are the failure rates of Reader 1 and Reader 2, respectively, vs. that of the collaborative read in the corresponding channel condition in FIGS. 11(a)-11(d). The dashed line in each figure has a slope of 2 denoting the condition of uncorrelated read failure incidences of individual readers. In FIG. 12(a), the failure rate of the collaborative reader CDMA scheme is close to the product of the failure rates of the two readers, and the slope in the log-log plot is around 2, indicating the expected condition of uncorrelated read failures of the two readers. In FIGS. 12(b)-12(d), when large scatterers were successively added to the reading zone, the yield of the individual reader starts to degrade much faster than that of the collaborative reader CDMA scheme. In FIG. 12(d), LoS of both readers are mostly blocked that the individual readers can only achieve failure rates of 0.2 (read yield of 80%) and 0.13 (read yield of 87%) under the largest Tx power, i.e., the diagonal terms of A(C) have relatively low probability to be 1. In comparison, the collaborative reader CDMA scheme can still reach below $10^{-5}$ failure rate (read yield>99.999%), which implies the off-diagonal terms of A(C) contribute significantly and their incidences of 0 are anti-correlated to those of the diagonal terms. Although the degree of improvement in read yields depends on the actual channel condition, the slopes in the collaborative CDMA scheme are in general much higher than 2, similar to the cases in FIGS. 12(b)-12(d), due to the rich channel availability and the anti-correlations of the read failure in each channel.

Although the present disclosure has been described with respect to one or more particular embodiments, it will be understood that other embodiments of the present disclosure may be made without departing from the spirit and scope of the present disclosure.

What is claimed is:

1. A collaborative RFID reading system, comprising:
a plurality of RFID readers, each of the plurality of RFID readers comprising a transmitter, a receiver, a processing device, and a non-transient memory device bearing a unique orthogonal code assigned to the RFID reader and bearing unique orthogonal codes assigned to each of the other ones of the plurality of RFID readers,
wherein the transmitter of each of the plurality of RFID readers is synchronized to a first baseband frequency, and
wherein the processor of each of the plurality of RFID readers is programmed to:
encode data according to the unique orthogonal code assigned to the RFID reader to produce a CDMA-encoded signal characteristic of the RFID reader; and
broadcast the CDMA-encoded signal via the transmitter.

2. The collaborative RFID reading system of claim 1, wherein the processor in each of the plurality of RFID readers is further programmed to, responsive to receipt of a response signal from an RFID tag, decode the response signal using the assigned unique orthogonal code or using a unique orthogonal code assigned to another one of the plurality of RFID readers.

3. The collaborative RFID reading system of claim 2, wherein a receiver carrier frequency is the same as, or is different than, a transmitter carrier frequency.

4. The collaborative RFID reading system of claim 3, wherein the receiver carrier frequency is a multiple of the transmitter carrier frequency.

5. The collaborative RFID reading system of claim 2, wherein the processor in each of the plurality of RFID readers is further programmed to broadcast, via the transmitter for the respective RFID reader, a polling signal to RFID tags within a range of the RFID reader.

6. The collaborative RFID reading system of claim 5, wherein the broadcast polling signal bears the unique orthogonal codes assigned to the plurality of RFID readers.

7. The collaborative RFID reading system of claim 1, wherein a second baseband frequency of the receiver in each of the plurality of RFID readers is synchronized to the first baseband frequency.

8. The collaborative RFID reading system of claim 1, wherein the first baseband frequency is synchronized via a common baseband clock signal.

9. The collaborative RFID reading system of claim 1, wherein each of the plurality of RFID readers is configured to simultaneously broadcast the CDMA-encoded signal via the transmitter and decode response signals from RFID tags.

10. A method for collaborative RFID reading across a plurality of RFID readers, comprising:
assigning a first code to a first RFID reader having a first baseband frequency;
producing a first encoded signal from the first RFID reader using the first code;
broadcasting the first encoded signal from the first RFID reader;
assigning a second code, different from the first code, to a second RFID reader having the first baseband frequency;
producing a second encoded signal from the second RFID reader using the second code;
broadcasting the second encoded signal from the second RFID reader;
receiving, at an RFID tag, at least one of the first encoded signal or the second encoded signal and generating, responsive thereto, a response signal;
receiving the response signal at the first RFID reader, the second RFID reader, or both the first RFID reader and the second RFID reader; and
decoding the response signal, when received at the first RFID reader, via the first code or the second code and decoding the response signal, when received at the second RFID reader, via the second code or the first code,
wherein the act of producing the first encoded signal from the first RFID reader using the first code comprises producing a first CDMA-encoded signal,
wherein the act of broadcasting the first encoded signal from the first RFID reader comprises broadcasting the first CDMA-encoded signal from the first RFID reader,
wherein the act of producing the second encoded signal from the second RFID reader using the second code comprises producing a second CDMA-encoded signal, and
wherein the act of broadcasting the second encoded signal from the second RFID reader comprises broadcasting the second CDMA-encoded signal from the second RFID reader.

11. The method according to claim 10,
wherein the first code comprises a first orthogonal code, and
wherein the second code comprises a second orthogonal code different than the first orthogonal code.

12. The method according to claim 10, wherein the first code and the second code are mutually-orthogonal codes.

13. The method according to claim 10, wherein the broadcasting of the first encoded signal from the first RFID reader and the broadcasting of the second encoded signal from the second RFID reader is performed at least substantially simultaneously.

14. The method according to claim 10, wherein the decoding of the response signal, received at the first RFID reader and received at the second RFID reader, is performed at least substantially simultaneously.

15. The method according to claim 10,
wherein the broadcasting of the first encoded signal from the first RFID reader and/or the broadcasting of the second encoded signal from the second RFID reader comprises passing the downlink signal through a low-pass filter prior to the act of broadcasting,
wherein the generating of the response signal by the RFID tag comprises generating a response signal having a frequency at a multiple of the broadcast first encoded signal or the broadcast second encoded signal, and
wherein the receiving of the response signal at the first RFID reader and/or at the second RFID reader comprises passing the uplink signal through a high-pass filter.

16. The method according to claim 15, wherein the response signal has a frequency twice that of the broadcast first encoded signal or the broadcast second encoded signal.

* * * * *